Aug. 24, 1943.   J. H. HODGSON ET AL   2,327,894
AMMUNITION
Filed Aug. 31, 1940                4 Sheets-Sheet 2

INVENTORS
JOHN R. BALDER
JOSEPH H. HODGSON
BY FRANCIS E. JAMES
ATTORNEYS

Aug. 24, 1943.    J. H. HODGSON ET AL    2,327,894
AMMUNITION
Filed Aug. 31, 1940    4 Sheets-Sheet 3
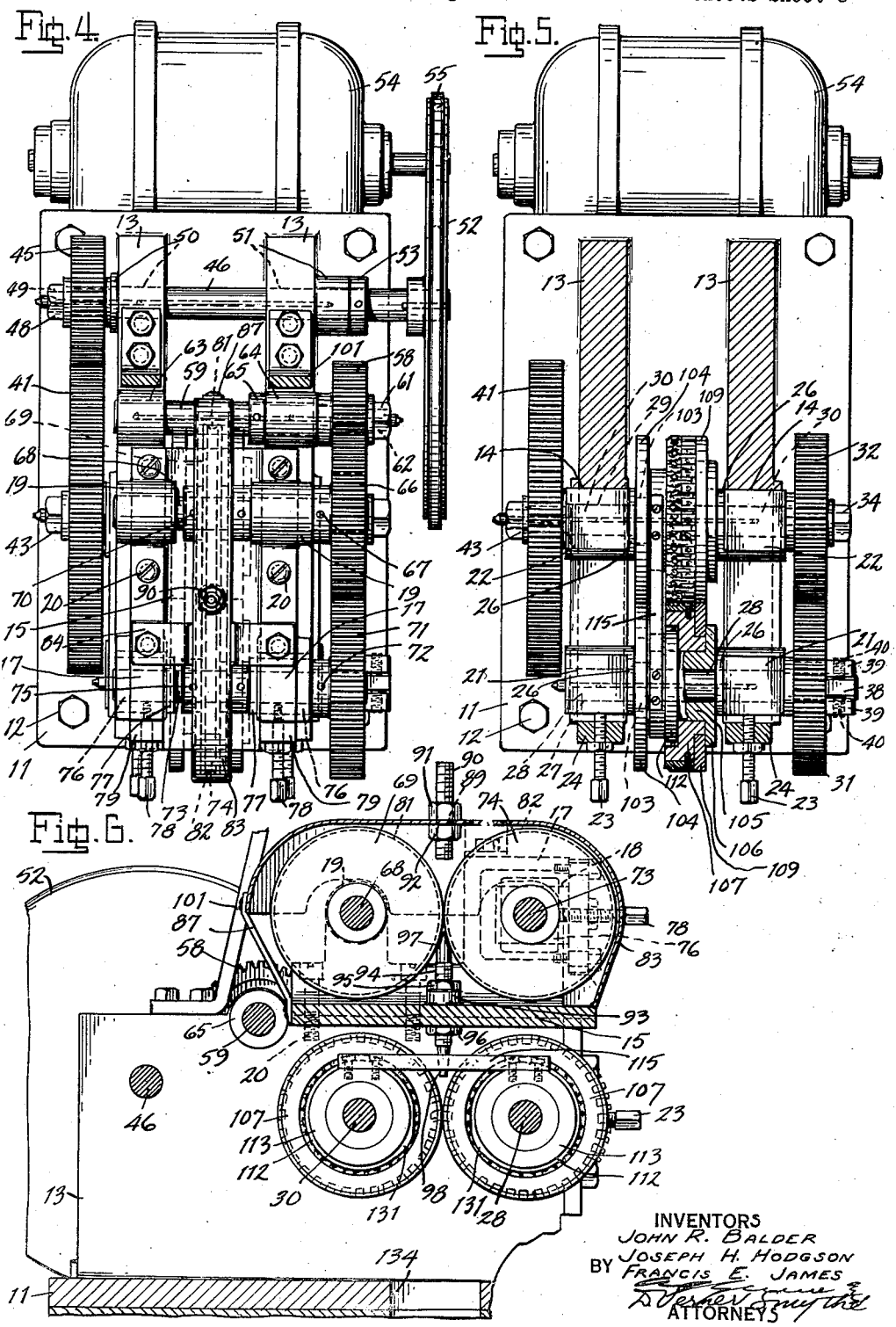
INVENTORS
JOHN R. BALDER
JOSEPH H. HODGSON
BY FRANCIS E. JAMES
ATTORNEYS

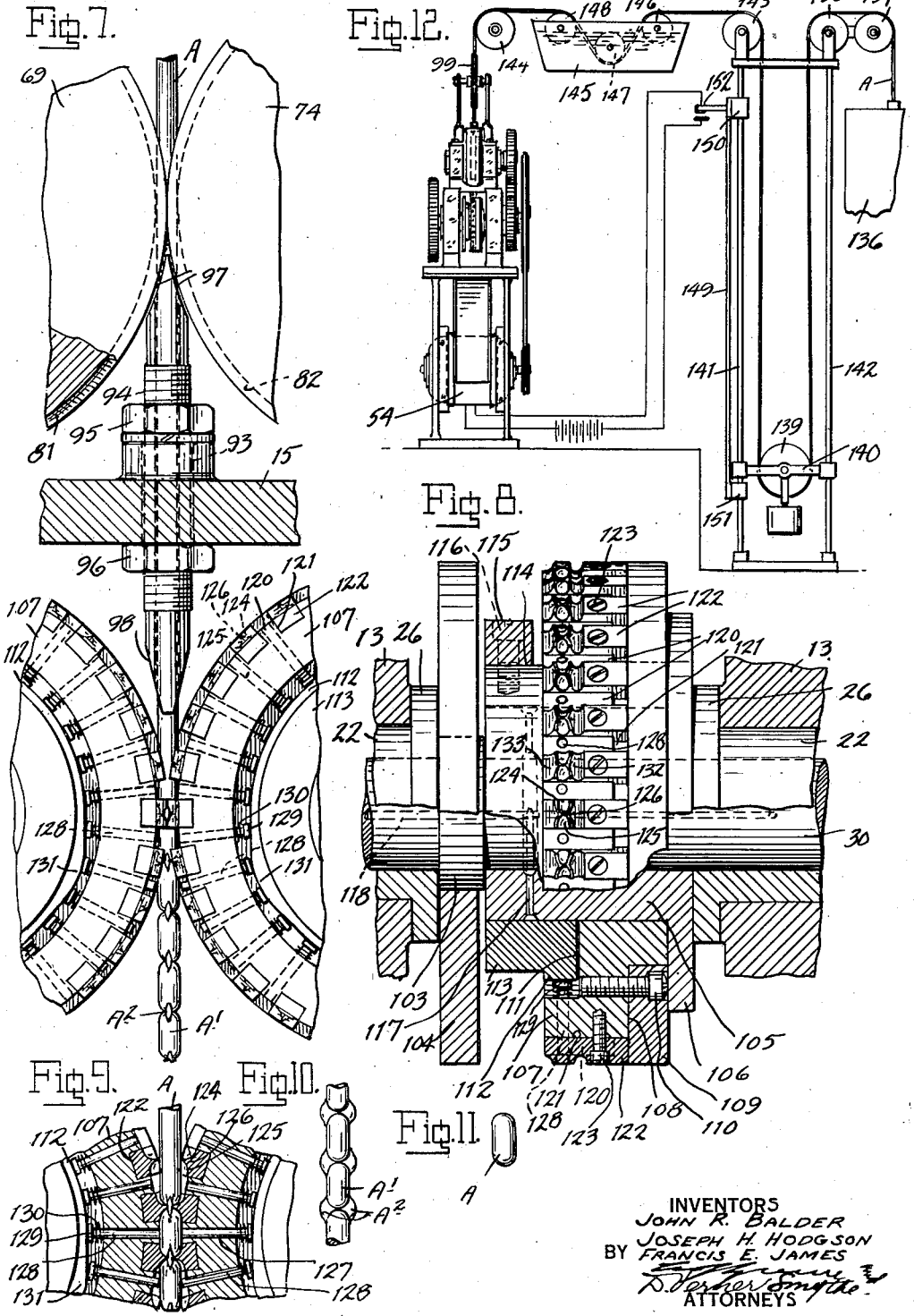

Patented Aug. 24, 1943

2,327,894

UNITED STATES PATENT OFFICE 2,327,894

AMMUNITION

Joseph H. Hodgson, Westport, John R. Balder, Stratford, and Francis E. James, Fairfield, Conn., assignors to Remington Arms Company, Inc., a corporation of Delaware Application August 31, 1940, Serial No. 354,996

9 Claims. (Cl. 29—1.22)

The present invention relates to a bullet slug forming machine, and particularly a machine which cuts and moulds bullet slugs from a continuous length of lead wire, such machine being preferably operated in conjunction with an extrusion press which extrudes the continuous length of lead wire.

In the production of bullets from bullet slugs it is extremely important that the slugs be of uniform formation, that they be substantially symmetrical at each end, and that they be free from cracks, grooves, cutter or mould marks, burs, and the like, which may produce irregularities in the formed bullet, and which irregularities will adversely affect the ballistic characteristics of the bullet in use.

It is an object of the present invention to provide a machine which will produce bullet slugs meeting these requirements, and to this end it is proposed to provide cooperative rotary wire feeding rolls, and cooperative rotary slug forming moulding wheels, the feeding rolls being driven by gearing in such cooperative timed relation with the moulding wheels that the effective wire feeding surface or peripheral speed of the feeding rolls is slightly greater than that of the moulding wheels. A pushing or forcing action is thus set up lengthwise of the wire between the feeding rolls and the moulding wheels, whereby the moulding cutter elements of the moulding wheels, which are designed to produce a symmetrical nose end upon each end of the slugs, will have the wire forced into them to completely fill the moulding cavities of the moulding wheels. The action of the moulding wheels upon the wire causes the upper ends of the cutting and moulding elements of the moulding wheels, as they move downwardly in converging arcs against the sides of the wire toward the horizontal diametric line of the moulding wheels where the cutting edges of the two wheels meet, to cut downwardly and inwardly into the wire at each side. As a result of this action concave undercuts are produced upon the lower end of the measured slug length, and if the moulding wheels engage a restrained wire, or wire being fed by the feeding rolls at a speed equal to that of the moulding wheels, these undercuts will remain in the lower nose end of the formed slug as grooves, cracks, burs or other objectionable formations. The pushing and forcing action on the wire of the feeding rolls, according to the invention, reduces the undercutting and also forces the wire downwardly into the lower moulding cavities as they meet along the horizontal diametric line of the two moulding wheels. As the upper moulding cavities converge and meet they produce downward longitudinal pressure on the upper nose end of the slug, and thus through the combined action of the upper and lower moulding cavities upon the downwardly forced wire the two nose ends will be moulded symmetrically and without the presence of objectionable grooves, cracks, burs or other irregularities.

A further object is to provide a machine which will permit of convenient separation of the parts for the purpose of threading the wire therein for the initial starting of the machine, and which will also permit of convenient interchangeability of different sized feeding rolls and moulding wheels for the purpose of producing different sized slugs.

Another object is to provide a slug forming machine in which there is a positive feed of the slug forming wire independent of the feed of such wire from an extrusion press or other source of supply. A further object is to provide a slug forming machine operated in conjunction with a wire extruding press, and to provide automatic start and stop means for the forming machine which will permit the continuous extrusion of the wire from the extruding machine at a different speed from the feeding of the wire by the slug forming machine, the automatic start and stop means being such that there is always a free loop of wire between the extruding machine and the forming machine, the forming machine being automatically stopped when the loop of wire reaches a predetermined minimum length and being automatically started when it reaches a predetermined maximum length.

With the above and other objects in view, an embodiment of the invention is shown in the accompanying drawings, and this embodiment will be hereinafter more fully described with reference thereto, and the invention will be finally pointed out in the claims.

In the drawings:

Fig. 4 is a top plan view.

Fig. 5 is a horizontal plan view taken along the line 5—5 of Fig. 1.

Fig. 6 is a vertical longitudinal sectional view taken along the line 6—6 of Fig. 2.

Fig. 7 is an enlarged fragmentary view showing the cooperative portions of the feeding rolls and moulding wheels, and showing the relation of the wire therein as it is formed into bullet slugs, the chain of formed bullet slugs being shown in side elevation.

Fig. 8 is an enlarged view partially in front elevation and partially in vertical section of one of the moulding wheels.

Fig. 9 is a fragmentary sectional view of the meeting portions of the moulding wheels with the center of the formed slug along the diametric meeting line of the wheels.

Fig. 10 is a view in front elevation of a portion of the chain of formed slugs, the same being shown in side elevation in Figs. 7 and 9.

Fig. 11 is a side elevation of one of the separated completed slugs.

Fig. 12 is a front elevation, showing the cooperative apparatus, according to the invention, consisting of the slug forming machine, wire extruding press, and automatic start and stop mechanism controlled by the length of wire between the forming machine and the extruding press.

Similar reference characters indicate corresponding parts throughout the several figures of the drawings.

Figure 1:
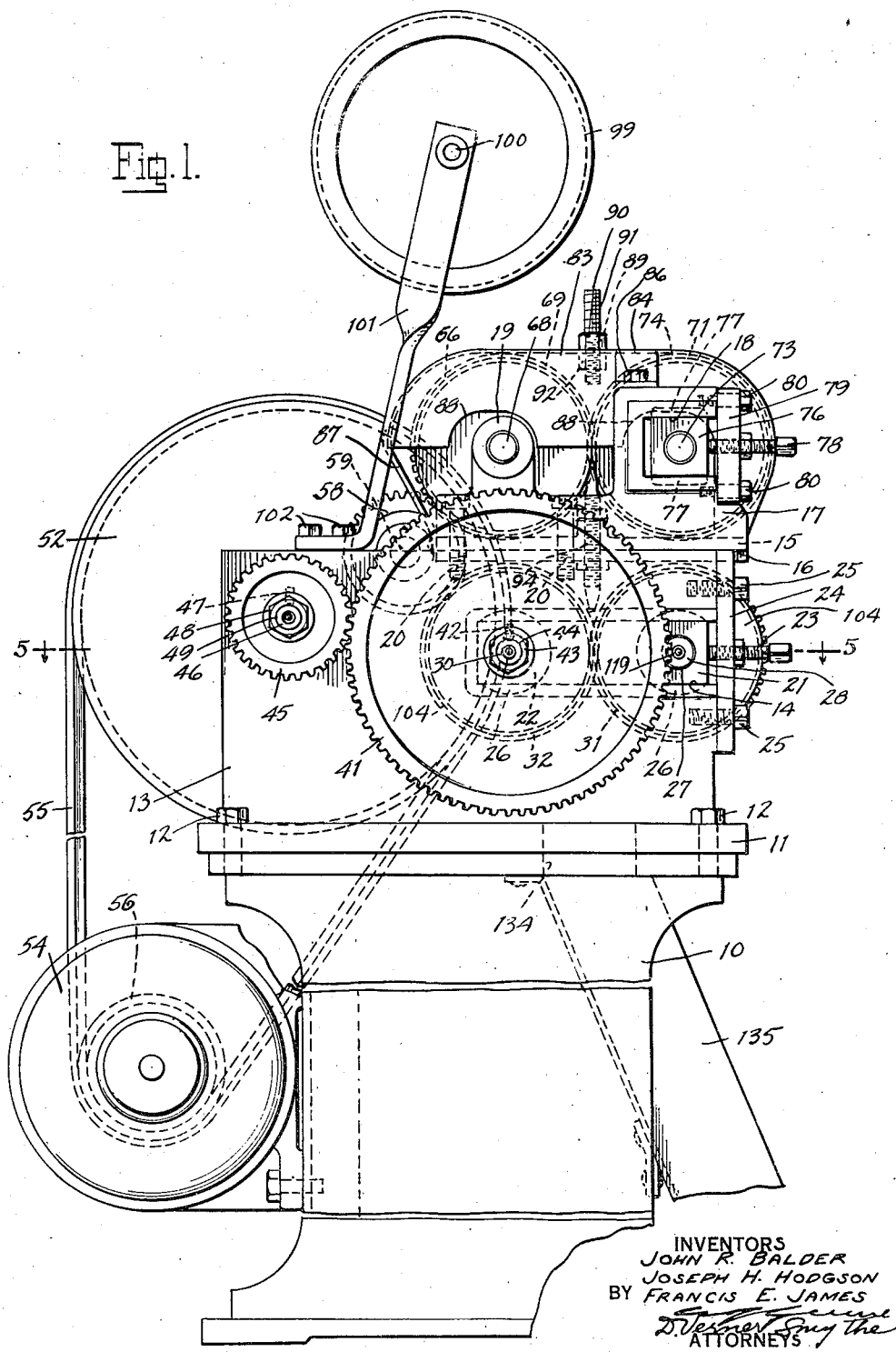
Fig. 1 is a side elevation of a bullet slug forming machine, according to the exemplary illustrated embodiment of the invention, portions of the supporting table base being broken away.
Figure 2:
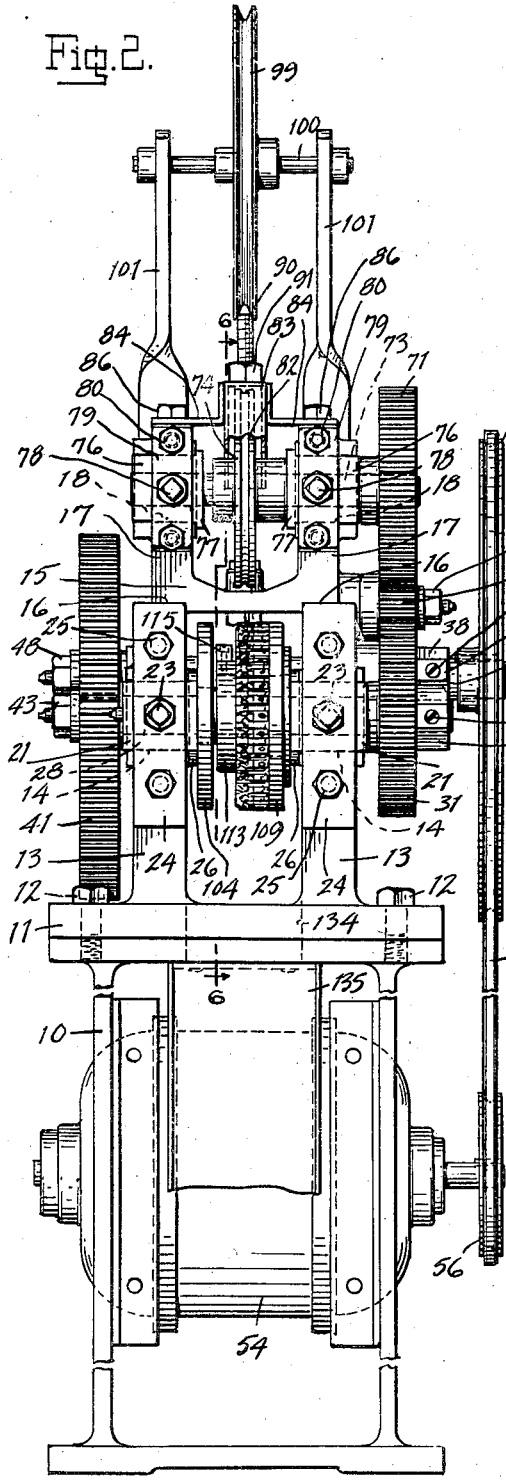
Fig. 2 is a front elevation.
Figure 3:
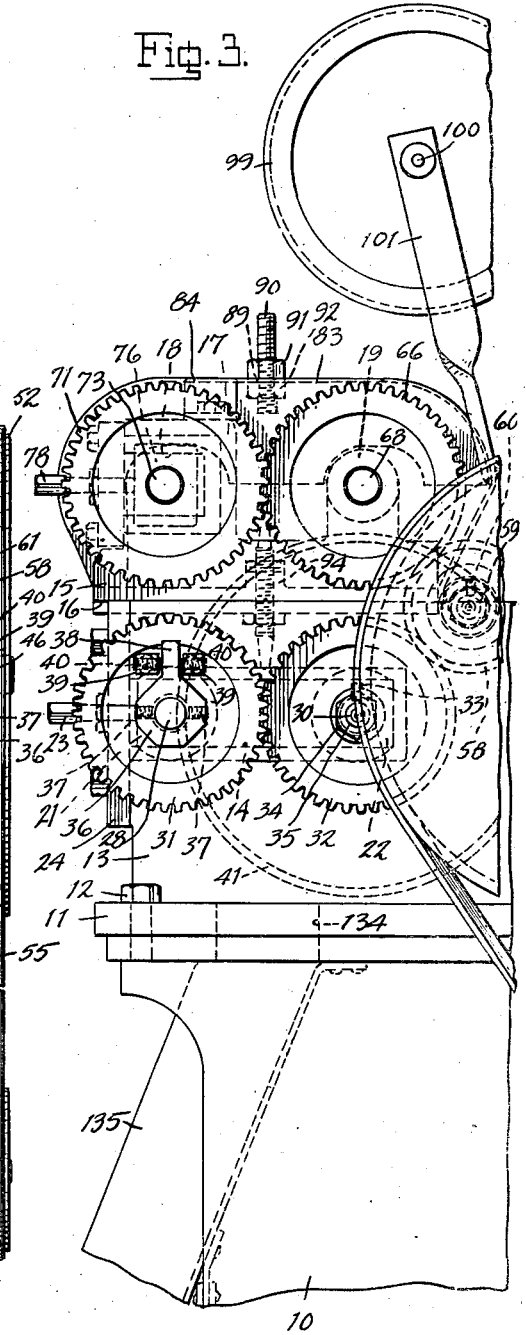
Fig. 3 is a side elevation, at the opposite side from that illustrated in Fig. 1, partially broken away.

Referring to the drawings, the slug forming machine, according to the exemplary illustrated embodiment of the invention, consists of a table base 10 upon which the rectangular base 11 of the main frame of the machine is secured by bolts 12, this frame having spaced parallel upright standards 13—13 of substantially rectangular form extending from front to rear. In each of the standards 13 there is provided a horizontal slot 14 of substantially rectangular form extending rearwardly from the forward end of the standard, in which the bearings for the moulding wheels are adjustably supported, as will presently more fully appear.

Upon the upper surface of the standards 13 there is mounted the frame supporting the feed rolls, hereinafter more fully referred to, this frame consisting of a horizontal base 15 having track forming angular recesses 16—16 at its longitudinal edges seating upon the upper sides of the standards 13. At each side and at the forward end of the base 15 there are provided spaced parallel upright standards 17—17, each provided with a rectangular slot 18 open at the forward side, and in which the bearings of the forward feed roll are adjustably supported, and in rearwardly spaced relation to the standards 17—17 there are provided upright bearing standards 19—19 constituting bearings for the rearward feed roll. The feed roll supporting frame is secured to the standards 13—13 by means of bolts 20.

Within the slots 14—14 of the standards 13—13 there are engaged the forward and rearward bearing blocks 21—21 and 22—22 of the forward and rearward moulding wheels, these blocks being flattened at the upper and lower surfaces to slidably engage in the slots 14 and also flattened at one vertical side, these vertical sides in the case of the rearward blocks 22 engaging the inner ends of the slots, and in the case of the forward blocks 21 being engaged by adjustable pressure screws 23—23 mounted in closure bars 24—24 secured upon the forward ends of the standards 13—13 by cap screws 25 to enclose the forward ends of the slots 14—14. The other upright sides of the blocks are circumferentially formed in continuation of the circumferential flanged inner end portions 26 of the blocks which engage the inner surface of the standards 13 to prevent outward displacement of the blocks in the slots 14—14.

Within the bores 27 of the blocks 21 there is rotatably engaged the shaft 28 of the forward moulding wheel and within the bores 29 of the rearward blocks 22 there is rotatably engaged the shaft 30 of the rearward moulding wheel. These two moulding wheels, which are of identical form and are mounted upon the respective shafts in identical manner, will be presently more fully described.

Upon one end of the shaft 28 there is secured a gear 31 which meshes with an identical gear 32 mounted upon one end of the shaft 30, this gear 32 being non-rotatably secured upon the shouldered end portion of the shaft by means of a key 33 and retained thereon by a nut 34 screwed upon the shouldered threaded end portion 35 of the shaft. The gear 31 is secured to the end of the shaft 28 by an adjustable connection which permits of convenient adjustment of the shaft relatively to the gear for the purpose of accurately aligning the two moulding wheels, this connection consisting of a hexagonal collar 36 engaged upon the projecting end of the shaft and secured thereto by a pair of opposed set screws 37—37, the collar being provided with an upwardly projecting lug 38 at each side of which there is provided a projecting block member 39 having a threaded shank which is screwed into the face of the gear 31, these block members being each provided with a set screw 40 which bears upon a side of the lug 38, and which through adjustment will minutely adjust the position of the gear 31 relatively to the shaft 28, while providing in the normal tightened position a rigid, positive drive connection between the shaft and the gear.

Upon the other projecting end of the shaft 30 from the gear 32 there is provided a large driving gear 41 non-rotatably secured upon the shouldered end portion of the shaft by a key 42, and retained thereon by a nut 43 screwed upon the shoulder threaded end portion 44 of the shaft, this gear 41 being engaged by a pinion drive gear 45 non-rotatably secured upon the shouldered end of the drive shaft 46 by means of a key 47, and retained upon said shaft by a nut 48 screwed upon the shouldered threaded end portion 49 of the shaft. The shaft 46 is journaled in bearing portions 50 and 51 of the respective standards 13—13, and has keyed upon its other end a large drive belt pulley 52, a collar 53 being secured upon the shaft against the outer side of the bearing portion 51 to prevent axial displacement of the shaft. The pulley 52 is driven from the drive motor 54 by means of a belt 55 extending over the motor pulley 56. The base of the motor is mounted upon the rearward side of the table base 10.

The gear 32 meshes with an idler pinion gear 58 non-rotatably secured upon the shouldered end portion of a shaft 59 by means of a key 60, and retained upon the shaft by a nut 61 screwed upon the shouldered threaded end portion 62 of the shaft, this shaft being journaled in bearing portions 63 and 64 of the respective standards 13—13, a collar 65 being secured upon the shaft at the inner side of the bearing portion 64 to prevent axial displacement of the shaft. The gear 58 meshes with and drives a gear 66 secured by a taper pin 67 upon the end of the shaft 68 of the rearward wire feed roll 69, secured to the shaft by a taper pin 70, the shaft 68 being journaled in the bearing standards 19—19 of the feed roll supporting frame. The gear 66 meshes with and drives an identical gear 71 secured by a taper pin 72 upon the end of the shaft 73 of the forward wire feed roll 74, secured by a pin 75 to the shaft 73, the shaft 73 being journaled in bearing block members 76—76 adjustably mounted in the rectangular bearing slots 18—18 of the standards 17—17. These bearing blocks are provided at their inner ends with flange portions 77 to position them against outward displacement, and are adjustably positioned in the slots by means of adjustable pressure screws 78—78 engaged in supporting bar members 79—79 secured by cap screws 80—80 upon the forward ends of the standards 17—17 to close the forward ends of the slots 18—18.

The gears 66 and 71 which drive the wire feed rolls are of slightly greater diameter than the gears 31 and 32, which drive the slug moulding wheels, and the effective wire feeding surface or peripheral speed of the feed rolls is slightly greater than that of the moulding wheels for the purpose of exerting a pushing or forcing action upon the wire between the feed rolls and the moulding wheels, as will hereinafter be more fully pointed out. This differential in wire feeding speed is produced by making the feed rolls of slightly greater diameter than the pitch diameter of the gears 66 and 71, while the moulding wheels are made of equal diameter to the pitch diameter of the gears 31 and 32. The wire feed rolls 69 and 74 are provided in their peripheries with semi-circular grooves 81, 83 respectively, which have knurled surfaces for the purpose of positively biting into and gripping the lead wire A, so as to provide a positive feed from the extrusion press or other source, and a positive pushing force as between the feed rolls and the moulding wheels.

The feed rolls are enclosed at their upper side by a guard member 83, supported at each side by angle brackets 84—84 secured to the upper side of the bearing standards 17—17 by cap screws 86—86, and supported at its rearward end by a bracket arm 87 extending to and secured to the rearward end of the frame 15. The lower edges of the guard are cut away, as at 88, to extend around the shafts 68 and 73. In a centrally disposed aperture 89 in the upper side of the guard there is secured a vertical exteriorly threaded guide tube 90 adjustably secured by retaining nuts 91, 92 engaging above and below the surface of the guard, and which projects downwardly between the feed rolls to guide the wire A thereto.

Centrally of the base portion of the frame 15 there is provided a vertical passage 93 in which there is engaged the exteriorly threaded tubular guide member 94, adjustably secured by nuts 95 and 96 engaging above and below the frame, and which guides the wire from the feed rolls to the moulding wheels, the upper end of this tube having converging concave faces 97 which fit closely between the two sides of the feed rolls, and the lower end having a downwardly projecting tapered nozzle portion 98 which projects downwardly into close proximity between the moulding wheels.

Above the feed rolls and the guard 83 there is provided a grooved guide wheel 99, the shaft 100 of which is supported upon the upper ends of a pair of arms 101 secured at their bases by cap screws 102 to the upper sides of the standards 13—13, and which guides the wire A vertically to the slug forming machine from the wire extruding press and the automatic start and stop mechanism, hereinafter more fully referred to.

Upon the shafts 28 and 30 there are respectively mounted the two moulding wheels upon the peripheries of which there is provided a series of wire cutting and moulding cavity elements, each constituting half-mould parts which register with the corresponding half-mould parts of the other wheel to constitute a pair of cutting knife edges and a complete nose forming mould cavity.

As both of the moulding wheels and their method of assembly upon the respective shafts 28 and 30 are identical, only one will be described in detail, and the same reference characters will be applied to the corresponding parts of both wheels.

Upon each of the shafts 28 and 30 there is provided adjacent the bearing blocks at one side an annular shoulder portion 103, upon which there is engaged by a force drive fit a circular disc member 104, which corresponds in diameter to the outside diameter of the moulding wheel, these plates upon the two shafts constituting shaft aligning means, which through contact with each other equalize the spacing of the shaft bearings at one side with those at the other side, the spacing of these latter bearings being determined by the contact of the moulding wheels.

A hub member 105 provided at one end with a circular flange 106 is engaged upon the shaft with a force drive fit against the shoulder 103, and upon this hub member there is carried the annular body ring 107 of the moulding wheel, which is nonrotatably secured upon the hub against the flange 106 by a force drive fit. At its outer periphery the ring member 107 is provided in its face adjacent the flange 106 with an annular recess 108 in which there is engaged a backing ring 109 secured by counter-sunk cap screws 110, the heads of these screws being beneath the rim of the flange 106 and the projecting rim portion of the ring 109 constituting a backing shoulder for the cutting and moulding elements, presently more fully referred to. Upon the other face of the ring 107 there is provided adjacent its inner periphery an annular recess 111 in which there is engaged an extractor pin operating cam 112, the hub 113 of which projects outwardly from the recess and is rotatably engaged by the hub member 105. The cam hub 113 is provided at its upper side with a flat surface 114 to which the end of a tie-bar 115 is secured by counter-sunk cap screws 116, and which tie bar secures the two cam members in stationary spaced relation, as shown clearly in Fig. 6.

Annular oil grooves and ducts 117 are provided in the hub 105 in communication with the oil ducts 118 in the shaft which provide lubrication for the bearing between the cam hub 113 and the wheel hub 105. The oil duct 118 extends to one end of the shaft where it is provided with a suitable lubricating fitting 119.

Upon the periphery of the body ring 107 there is provided a series of spaced parallel radially projecting block portions 120 which provide a series of pockets 121 between them, the opposed side walls of which are parallel, and which are adapted to receive the cutting and moulding cavity members 122, each of which is secured to the body ring by a counter-sunk cap screw 123. At the outer end portion of each member 122 there is provided a pair of oppositely disposed nose-forming half-mould cavities 124 and 125 having a knife edge 126 between them, the mould cavity 125 adapted in cooperation with the registering corresponding mould cavity 125 of the other wheel to form the upper nose forming mould cavity of one slug, while the registering cavities 124 form the lower nose forming mould cavity of the following slug. Thus an upper half-mould cavity 125 of one of the members 122 constitutes with the lower half-mould cavity 124 of the adjacent member 122 a complete half-mould cavity for forming one slug $A^1$.

Within each of the block portions 120 there is provided a radial passage 127 which extends to the annular recess 111, and within which there is slidably engaged an extractor pin 128 provided at its inner end with a head 129 which slides upon the cam 112 and against which it is pressed by means of a spring 130 disposed between the head 129 and the annular wall of the recess 111. In the normal position of the extractor pin its outer end is flush with the outer surface of the block 120 and is disposed centrally of the mould cavities 124 and 125 of the mould members 122 at each side of the block portion 120. As these extractor pins move downwardly below the horizontal diametric line of the two wheel members, along which the knife edges and mould cavities meet, they successively ride upon a rise 131 of the cam, the surface of which is parallel to the vertical line of movement of the wire A and slugs $A^1$, so that as the mould cavities move away from the formed slug the extractor pins at each side of the slug force it out of the mould cavities and thus maintain the chain of slugs in a vertical line, as clearly indicated in Fig. 7.

At each side of the moulding cavities there are provided clearance recesses 132 and 133, into which is pinched the excess metal formed by the slug moulding operation, in the form of fins $A^2$, as in Figs. 9 and 10, the connection between these fins and the slugs $A^1$ being sufficiently thin so that they will readily separate through bending or tumbling.

Because of the differential wire feeding action of the feed rolls and the moulding wheels, by which the effective wire feeding surface or peripheral speed of the feed rolls is slightly greater than that of the moulding wheels, a pushing or forcing action is exerted lengthwise upon the wire between the point at which the wire is gripped between the knurled groove surfaces of the feed rolls and the point at which the knife edges and mould cavities of the moulding wheels converge and bite into the sides of the wire. As a consequence the undercuts which are produced upon the downwardly disposed nose ends by the knife edges as they cut downwardly into the wire are pressed downwardly into the lower mould cavity surfaces thus reducing the extent of such undercuts, and as the knife edges meet along the horizontal diametric line of the two moulding wheels the downward force on the wire presses it tightly into the lower mould cavities. At the same time the upper mould cavities press downwardly upon the upper end of the slug as they converge and meet at the horizontal diametric line, this combined action together with the downward force on the wire causing both nose ends to be pressed into smooth conforming relation to the mould cavities. Should there be no downward force upon the wire or should it be fed at exactly the same rate by both the feed rolls and the moulding wheels the amount of metal clipped by the converging cutting edges of the downwardly moving mould member 122 would, due to the undercutting be less than the amount of metal that could be properly accommodated within the mould cavity when it meets along the horizontal diametric line of the moulding wheels, and as a consequence, there would be a tendency to produce grooves, cracks, voids, and the like in the surface of the slug. According to the present invention however the differential surface speed predetermines the amount of metal entering the mould cavities to substantially the amount which will completely fill them, thus insuring smooth symmetrical nose ends upon the slugs.

As the chain of slugs moves downwardly between the wheels it passes through an opening 134 in the bed of the machine to an inclined chute 135 which directs them to a suitable receptable. The formed slugs are preferably tumbled and lubricated for ultimate use in a machine for forming the slugs into bullets. The completed slug is shown in Fig. 11.

In Fig. 12 I have illustrated the slug forming machine, according to the invention, in its cooperative relation with an extrusion press, indicated at 136, the wire A being extruded upwardly from this press and thereupon passing over grooved guide pulleys 137 and 138 and being carried downwardly in the form of a loop about a weighted pulley 139 carried in a frame 140 slidably engaged upon vertical rod supports 141 and 142, the wire extending upwardly from the weighted pulley 139 over a pulley 143 from which it extends to a pulley 144 disposed in vertical alignment above the slug forming machine and from which the wire feeds downwardly over the guide wheel 99.

In its transition from the pulley 143 to the pulley 144 the wire preferably passes through a water cooling tank 145 provided with guide rollers 146, 147 and 148, the wire passing over the roller 146, under the roller 147 through the water, and over the roller 148.

Upon the rod 141 there is slidably mounted for vertical shifting movement a switch operating bar 149 having slide abutments 150 and 151 at its ends which are disposed in the path of the frame 140 as the latter reaches the upper and lower limits of its vertical movement on the rod supports 141 and 142. The bar 149 operates a switch 152 which controls the starting and stopping of the electric motor 54, the switch being opened through upward movement of the bar 149 to stop the motor and closed through downward movement of the bar 149 to start the motor.

In operation the motor will start as soon as the loop extending over the weighted pulley 139 is long enough to engage the frame 140 with the abutment 151 to move the switch operating bar 149 downwardly to close the switch. The operation of the slug forming machine then starts, and as it draws the wire into it at greater speed than the speed of the extrusion from the extruding press 136 the loop about the roller 139 will gradually shorten and this will continue until the frame 140 engages the abutment 150 to raise the rod 149 to open the switch to stop the operation of the slug forming machine, the extrusion of the wire from the extrusion press continuing while the slug forming machine is stopped and causing the loop about the weighted pulley 139 to lengthen until it reaches a point where the frame 140 again engages the lower abutment 151 of the bar 149 and again automatically starts the slug forming machine.

Other types of motor switch may be used such as a conventional line starter having a solenoid switch operator and switch holding magnet. As the loop reaches the bottom a normally open limit switch would energize the solenoid to close the motor switch and when the loop reached the top a normally closed limit switch would de-energize the magnet to open the motor switch.

The form of the invention illustrated in the drawings and described herein is typical and illustrative only, and it is evident that the invention is capable of embodiments in other forms, all falling within the scope of the appended claims which are to be broadly construed.

What is claimed is:

1. In a machine for forming slugs from wire, a pair of feed rolls arranged to receive and feed wire between them, and a pair of moulding wheels arranged to receive said wire between them from said feed rolls and to mould the wire into slugs, each of said moulding wheels having upon its periphery a series of sequentially arranged half-mould cavities, and drive means for driving both said pair of feed rolls and said pair of moulding wheels simultaneously in wire feeding direction at a uniform speed, the uniform peripheral speed of said feed rolls being greater than the uniform peripheral speed of said moulding wheels.

2. In a machine for forming slugs from wire, a pair of feed rolls arranged to receive and feed wire between them, and a pair of moulding wheels arranged to receive said wire from said feed rolls and to mould the wire into slugs, each of said moulding wheels having upon its periphery a series of sequentially arranged half-mould cavities, and drive means for driving said pair of feed rolls comprising an intermediate gear driven by said pair of moulding wheels, said feed rolls being driven continuously at a slightly greater wire feeding surface speed than said moulding wheels.

3. In a machine for forming slugs from wire, a pair of feed rolls arranged to receive and feed wire between them, and a pair of moulding wheels arranged to receive said wire from said feed rolls and to mould the wire into slugs, each of said feed rolls having upon its periphery a frictional wire gripping groove, and each of said moulding wheels having upon its periphery a series of sequentially arranged half-mould cavities, and drive means for driving said pair of feed rolls and said pair of moulding wheels simultaneously in wire feeding direction, said feed rolls being slightly larger in diameter than said moulding wheels and having a slightly greater wire feeding surface speed than said moulding wheels.

4. In a machine for forming slugs from wire, a pair of feed rolls arranged to receive and feed wire between them, and a pair of moulding wheels arranged to receive said wire from said feed rolls and to mould the wire into slugs, each of said moulding wheels having upon its periphery a series of sequentially arranged half-mould cavities, a rigid tubular wire guide member between said feed rolls and said moulding wheels, and drive means for driving said pair of feed rolls and said pair of moulding wheels simultaneously in wire feeding direction, said feed rolls having a slightly greater wire feeding surface speed than said moulding wheels.

5. In a machine for forming slugs from wire, a pair of feed rolls arranged to receive and feed wire between them, and a pair of moulding wheels arranged to receive said wire between them from said feed rolls and to mould the wire into slugs, each of said moulding wheels having upon its periphery a series of sequentially arranged half-mould cavities, equal size intermeshing gears carried by said feed rolls, equal size intermeshing gears carried by said moulding wheels, an idler gear between one of the gears of said feed rolls and one of the gears of said moulding wheels, and drive means for said chain of gears whereby said feed rolls and said moulding wheels are driven simultaneously in wire feeding direction.

6. In a machine for forming slugs from wire, a pair of feed rolls arranged to receive and feed wire between them, and a pair of moulding wheels arranged to receive said wire between them from said feed rolls and to mould the wire into slugs, each of said moulding wheels having upon its periphery a series of sequentially arranged half-mould cavities, equal size intermeshing gears carried by said feed rolls, equal size intermeshing gears carried by said moulding wheels, an idler gear between one of the gears of said feed rolls and one of the gears of said moulding wheels, and drive means for said chain of gears whereby said feed rolls and said moulding wheels are driven simultaneously in wire feeding direction, said feeding rolls being slightly greater in diameter than the pitch diameters of said gears carried thereby, and said moulding wheels being substantially equal in diameter to the pitch diameters of said gears carried thereby, whereby said feed rolls have a slightly greater wire feeding surface speed than said moulding wheels.

7. In a machine for forming slugs from wire, a pair of moulding wheels adapted to receive wire between them and to mould the wire into slugs, each of said moulding wheels having upon its periphery adjacent one edge a series of sequentially arranged half-mould cavities and a cylindrical pressure contact portion adjacent the other edge, a pressure contact disc co-axial with each moulding wheel of equal diameter to the cylindrical pressure contact portion and disposed at the opposite side of the moulding wheel therefrom, and drive means for driving said moulding wheels to cause said wire to be drawn between them.

8. In combination, means adapted to produce a continuous length of wire, and means for forming slugs from said wire comprising a pair of moulding wheels arranged to receive said wire between them and to mould the wire into slugs, drive means for driving said moulding wheels to cause said wires to be drawn between them, and start and stop means for said drive means arranged between said wire producing means and said slug forming means adapted to be engaged by a loop of said wire, and comprising means adapted to be moved through said loop as it lengthens and shortens, and start and stop means actuated by said last named means to start and stop said drive means arranged to start said drive means as said loop reaches a predetermined maximum length and to stop said drive means as said loop reaches a predetermined minimum length.

9. In a machine for forming slugs from wire, a pair of molding wheels arranged to receive a wire between them, each of said wheels having in its periphery rectilinear notches separated by integral peripherally arcuate projections; and a molding block held in each of said notches, adjacent blocks being separated by said projections, there being in each of said blocks reversely facing mold cavities having mold surfaces which merge with the arcuate faces of said projections, whereby each half mold on each wheel comprises oppositely facing mold cavities on two adjacent blocks and the arcuate face of a projection separating said blocks.

JOSEPH H. HODGSON.
JOHN R. BALDER.
FRANCIS E. JAMES.